March 20, 1973 M. R. HAYNES 3,721,033
TRANSISTORIZED FLASHING FISH LURE
Filed March 31, 1970
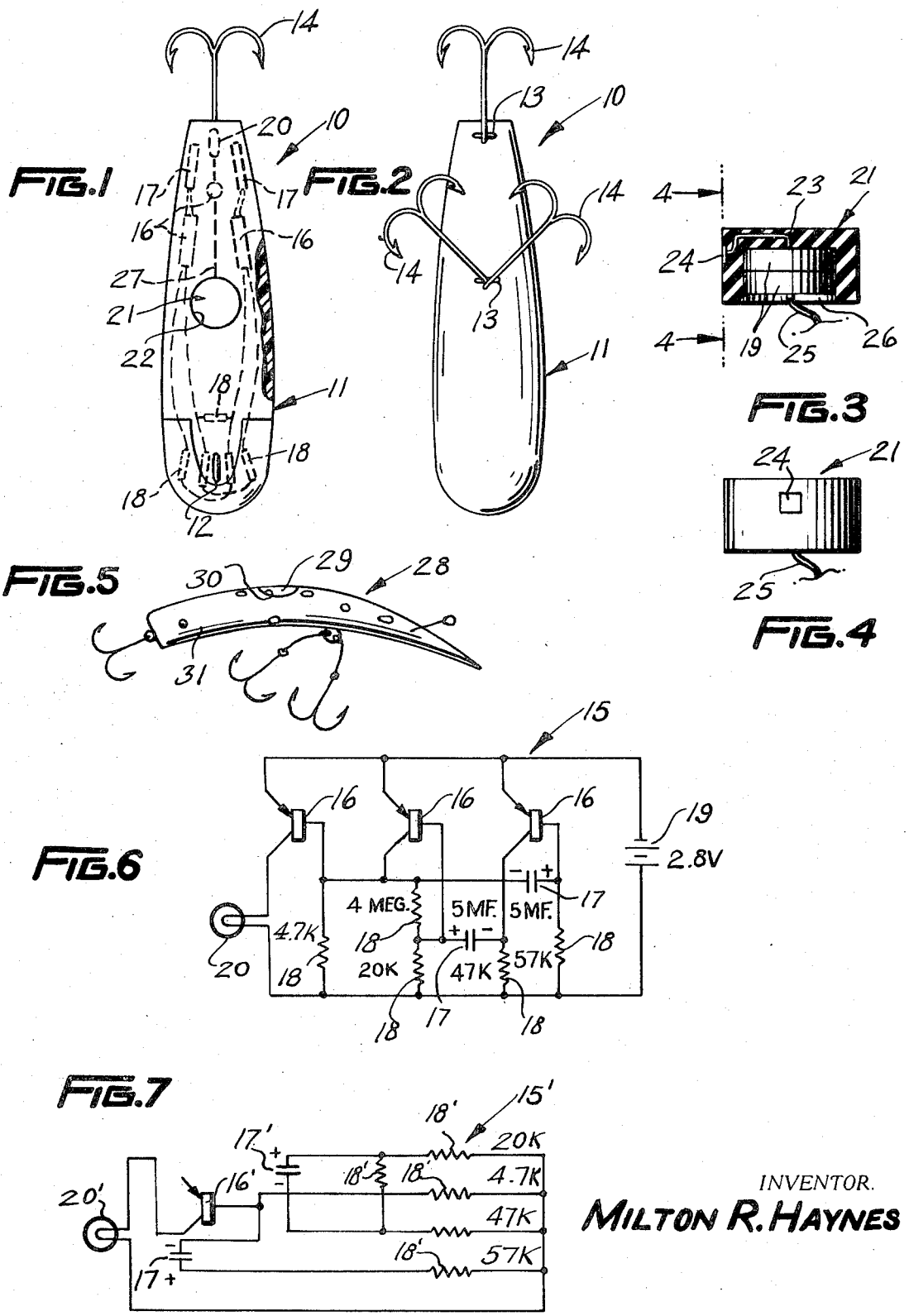
INVENTOR.
MILTON R. HAYNES

United States Patent Office 3,721,033
Patented Mar. 20, 1973

3,721,033
TRANSISTORIZED FLASHING FISH LURE
Milton Ray Haynes, 106 Baseline Road,
Northville, Mich. 48161
Filed Mar. 31, 1970, Ser. No. 24,088
Int. Cl. A01k *85/00*
U.S. Cl. 43—17.6
1 Claim

ABSTRACT OF THE DISCLOSURE

A fish lure having a molded plastic body in which a transistorized circuit is molded into the body of the lure. This transistorized circuit provides the means of flashing a miniature light bulb in order to be enticing to the fish. The body of the device includes a removable rubber plug which contains the batteries for operating the circuit of the device, the plug also has molded into it a wire which extends to a contact, the contact providing a method of engaging a wire on the opening the plug is received in. The other wire extends out of the opening of the plug for connection with the internal circuit of the lure.

---

This invention relates to artificial bait for fishermen, and more particularly, to a transistorized fishing lure.

It is therefore the main purpose of this invention to provide a lure which will have a self contained transistor circuit with battery means included for fishing a miniature lamp which will be visible through the lure.

Another object of the invention is to provide a fish lure which will have the transistorized circuit, bulb and battery unit all enclosed within the body of the lure, the battery portion being contained within a removable rubber plug.

A further object of this invention is to provide a lure which will be of molded plastic, the transistors, bulb, resistors, and capacitors being molded into the lure when it is formed, the body of the lure having an opening for the insertion of the rubber plug containing the batteries for operating the internal or transistorized circuit.

A still further object of this invention is to provide a lure of the type described which will have the circuit components placed in such a manner so as to have a balanced lure.

Other objects of the invention are to provide a transistorized, flashing fish lure which is simple in design, inexpensive to manufacture, rugged in construction, easy to use and efficient in operation.

These and other objects will be readily evident upon a study of the following specification and the accompanying drawing wherein:

FIG. 1 is a top plan view of the present intvention shown partly broken away;

FIG. 2 is a bottom plan view of FIG. 1 showing the mounting of the treble hooks;

FIG. 3 is an enlarged horizontal view of the battery containing rubber plug which is shown in elevation and in section;

FIG. 4 is a view taken along the lines 4—4 of FIG. 3;

FIG. 5 is a perspective view showing a modified form of lure;

FIG. 6 is a schematic wiring diagram of the transistorized circuit of the present invention; and FIG. 7 shows a modified arrangement of the circuit for placement in the mold in order to form the lure.

According to this invention, a fish lure 10 is shown to include a molded plastic body 11 having an eye 12 for attachment to a line (not shown). A pair of eyes 13 on the bottom of body 11 providing means for retaining a plurality of treble hooks, 14.

The internal circuit 15 of body 11 is shown to include a plurality of transistors 16 one of which is wired in reverse in order to reduce the number of transistors 16 and still produce a flashing illumination for lure 10. Also wired into the circuit 15 containing the transistors 16 are capacitors 17, resistors 18, the batteries 19 and a miniature bulb 20.

The plug 21 of rubber is frictionally inserted into the circular opening 22 of body 11 and plug 21 has a wire 23 molded into its structure with one end of the wire 23 secured fixedly to a contact 24 embedded in the outer periphery of plug 21. The other end of wire 23 is connected to one of the batteries 19, the other battery having a wire 25 connected thereto for connecting with the circuit 15. Wire 25 extends out of the opening 26 in which batteries 19 are placed.

It shall be noted that the metal contact 24 secured to wire 23 of plug 21, provides a means for engaging a wire 27 on the inner periphery of opening 22 of body 11.

In operation, plug 21 when inserted into opening 22 with the contact 24 engaging wire 27 and the wire 25 connected to the other side of circuit 15, will cause bulb 20 embedded within body 11 to lure 10 to fish intermittently in order to attract fish to be caught upon the hooks 14 of lure 10.

Looking now at FIG. 7 of th drawing, one will see a modified arrangement of a transistorized circuit 15' which includes transistors 16', capacitors 17', resistors 18', and a miniature bulb 20', the arrangement being such that it may be easily molded while maintaining balance for a lure.

Referring now to FIG. 5 of the drawing, one will see a modified form of molded and transistorized lure 28 having an insertable battery containing plug 29 in opening 30 of the plastic body 31.

Lure 28 operates in the same aforementioned manner as that of the main embodiment of the present invention.

I claim:
1. In a transistorized flashing fishing lure the combination of a hollow plastic body, a plurality of treble hooks attached to said body, a removable plug inserted into said body, said body containing components of an electrical circuit including a miniature bulb, a plurality of transistors, resistors, capacitors and wire conductors therebetween and a battery contained in said plug, one end of said body being translucent so that light produced by said bulb is visible externally of said body, said plug comprising a circular member receivable in a circular depression along a side of said body, a contact within said depression being engageable with a corresponding contact on a side of said plug so to connect to one side of said battery while the other side of said battery is connected by a conductor to said circuit components in the body, and one of said plurality of transistors being wired in reverse connection position in order to reduce a number of said transistors and still produce a flashing illumination, and said circuit components being placed in such manner so to balance said lure.

References Cited

UNITED STATES PATENTS

| | | | |
|---|---|---|---|
| 3,213,562 | 10/1965 | Salvin et al. | 43—17.6 |
| 2,217,565 | 10/1940 | Seigle et al. | 43—17.6 |
| 2,757,475 | 8/1956 | Pankove | 43—17.1 |
| 3,040,462 | 6/1962 | Guida | 43—17.6 |
| 3,535,812 | 10/1970 | Crecelius | 43—17.6 |

WARNER H. CAMP, Primary Examiner